(12) United States Patent
Itou et al.

(10) Patent No.: US 8,701,801 B2
(45) Date of Patent: Apr. 22, 2014

(54) ELECTRIC VEHICLE

(75) Inventors: Chinami Itou, Iwata (JP); Yoshinori Itakura, Iwata (JP); Minoru Suzuki, Iwata (JP); Hiromichi Bando, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/702,788

(22) PCT Filed: Jun. 9, 2011

(86) PCT No.: PCT/JP2011/063236
§ 371 (c)(1),
(2), (4) Date: Dec. 7, 2012

(87) PCT Pub. No.: WO2011/155558
PCT Pub. Date: Dec. 15, 2011

(65) Prior Publication Data
US 2013/0098695 A1    Apr. 25, 2013

(30) Foreign Application Priority Data

Jun. 9, 2010   (JP) ................................. 2010-132016
Jun. 2, 2011   (JP) ................................. 2011-124043

(51) Int. Cl.
*B60K 17/30*   (2006.01)
(52) U.S. Cl.
USPC .......... 180/6.28; 180/234; 180/236; 180/237; 180/65.51
(58) Field of Classification Search
USPC ....................... 180/6.28, 234, 236, 237, 65.51
See application file for complete search history.

(56) References Cited

U.S. PATENT DOCUMENTS 2,822,214 A      2/1958   Rivolta
5,570,754 A *   11/1996   Stimson ...................... 180/234

(Continued)

FOREIGN PATENT DOCUMENTS

JP      7-309268      11/1995
JP   2000-351592      12/2000

(Continued)

OTHER PUBLICATIONS

International Preliminary Report on Patentability issued Jan. 24, 2013 in International (PCT) Application No. PCT/JP2011/063236.

(Continued)

*Primary Examiner* — Joseph M Rocca
*Assistant Examiner* — Marlon Arce
(74) *Attorney, Agent, or Firm* — Wenderoth, Lind & Ponack, L.L.P.

(57) ABSTRACT

An electric vehicle which includes in-wheel motor driving devices and an independent-steering apparatus and is capable of making pivot turns within a minimum-required parking space, having a structure without a chassis and a part of the body protruding out of a minimum-required circular space necessary for the wheels to make pivot turning. In a case where the electric vehicle has four wheels including left and right front wheels and left and right rear wheels, an in-wheel motor driving device is incorporated only in the left and right front wheels, only in the left and right rear wheels, or in all of the wheels. An independent-steering apparatus serves for all of the wheels. A kingpin axis in each of the wheels makes an intersection with a road surface on a circle inboard of a vehicle chassis.

16 Claims, 6 Drawing Sheets

(56) References Cited

U.S. PATENT DOCUMENTS

| | | | | |
|---|---|---|---|---|
| 6,732,824 | B2* | 5/2004 | Sugata | 180/65.51 |
| 6,913,102 | B2* | 7/2005 | Sugata et al. | 180/253 |
| 7,464,785 | B2* | 12/2008 | Spark | 180/236 |
| 7,857,085 | B2* | 12/2010 | Spark | 180/236 |
| 7,905,302 | B2* | 3/2011 | Hammonds | 180/6.2 |

FOREIGN PATENT DOCUMENTS

| | | |
|---|---|---|
| JP | 2000-351595 | 12/2000 |
| JP | 2001-19397 | 1/2001 |
| JP | 2005-7914 | 1/2005 |
| JP | 2006-69412 | 3/2006 |
| JP | 2007-216930 | 8/2007 |
| JP | 2009-23561 | 2/2009 |
| WO | 00/32462 | 6/2000 |
| WO | 00/76902 | 12/2000 |

OTHER PUBLICATIONS

International Search Report issued Aug. 23, 2011 in International (PCT) Application No. PCT/JP2011/063236.
Supplementary European Search Report issued Sep. 23, 2013 in corresponding European Application No. EP 11 79 2515.

* cited by examiner

ELECTRIC VEHICLE

TECHNICAL FIELD

The present invention relates to electric vehicles, and particularly to electric vehicles including in-wheel motor driving devices and independent-steering apparatuses for easy pivot turning.

BACKGROUND ART

Electric vehicles including in-wheel motor driving devices, and electric vehicles including independent steering apparatuses implemented by steering-by-wire system are both already public (Patent Literature 1 and 2).

The in-wheel motor driving device includes a motor section which generates a driving force; a speed reducer section which reduces rotating speed of the motor section and outputs the rotating force; and a wheel hub which transmits the output from the speed reducer section to a driving wheel. The speed reducer section is provided by a planetary gear system for example. An onboard motor controller provides electronic control on rotation speed, rotation direction, etc. of the in-wheel motor driving devices (Patent Literature 1 and 2).

The independent-steering apparatus implemented by steering-by-wire system uses a steering actuator installed in each vehicle wheels. The apparatus includes a steering angle controller which, in response to the vehicle driver's operation on the steering wheel, calculates target steering angles and provides electronic control on the steering actuators thereby setting the wheels to appropriate steering angles (Patent Literature 3).

An electric vehicle equipped with the independent steering apparatus can make pivot turning, i.e., turning on the spot, by placing the front wheels in a forwardly narrowing pattern, placing the rear wheels in a rearwardly narrowing pattern, and then, if the vehicle is a two-wheel drive type, by rotating the left and the right driving wheels in the front or rear of the vehicle in mutually opposite directions. In a four-wheel drive vehicle, the left and the right wheels are rotated in mutually opposite directions in both of the front and rear pairs, with the front and the rear left wheels rotated in the same direction while the front and the rear right wheels rotated in the same direction. Such a control provides pivot turning.

CITATION LIST

Patent Literature

Patent Literature 1: JP-A 2005-7914
Patent Literature 2: JP-A 2007-216930 (FIG. 1 and FIG. 4)
Patent Literature 3: JP-A 2009-23561 (FIG. 1 and FIG. 3)

SUMMARY OF INVENTION

Technical Problem

However, in conventional electric vehicles, the body is made to have a rectangular shape in a plan view following traditional engine-driven automobiles, so the vehicle body is longer in the fore-aft direction. If such a vehicle attempts pivot turning at a place where there is not sufficient space in the vehicle's widthwise direction, the vehicle will interfere with surrounding objects such as other vehicles and buildings.

It is therefore an object of the present invention to provide an electric vehicle which includes in-wheel motor driving devices and an independent-steering apparatus and is capable of making pivot turns within a minimum-required parking space, by providing a structure without a chassis and apart of the body protruding out of a minimum-required circular space necessary for the wheels to make pivot turning.

Solution to Problem

In order to achieve the above-described object, the present invention provides an electric vehicle which includes: three wheels consisting of a front wheel and a left and a right rear wheels or consisting of a left and a right front wheels and a rear wheel; an in-wheel motor driving device incorporated only in the front wheels, only in the rear wheels, or in all of the wheels. The vehicle further includes an independent-steering apparatus for all of the wheels. With these arrangements, a kingpin axis in each wheel makes an intersection with a road surface on a circle which is defined inboard of a vehicle body.

The present invention also provides an electric vehicle which includes: four wheels consisting of a left and a right front wheels and a left and a right rear wheels; an in-wheel motor driving device incorporated only in each of the left and the right front wheels, only in each of the left and the right rear wheels, or in all of the wheels. The vehicle further includes an independent-steering apparatus for all of the wheels. With these arrangement, a kingpin axis in each wheel makes an intersection with a road surface on a circle which is defined inboard of a vehicle body.

The vehicle body is generally cylindrical, and preferably a platform is provided in the front of the body.

Advantageous Effects of Invention

The electric vehicle according to the present invention is capable, with the independent-steering apparatus, of orienting the wheels in directions which enable pivot turning even at a place not spacious enough for a normal turn. Therefore, as far as a space has a width which is wide enough for the vehicle to drive in, the vehicle does not require any more space and can make pivot turning without interfering with the surrounding objects. Thus, even if the vehicle was driven by forward driving into a narrow parking space with a dead end, it is possible to make a pivot turn and get out of the space by forward driving.

Also, due to the use of in-wheel driving units, it is possible to provide sufficient space between the left and the right front wheel housings not only in a case where the vehicle is a rear wheel drive type but also in a case where it is a front wheel drive type as well as in a case where it is an all wheel drive type. This allows a platform to be provided in the front portion of the vehicle body, which makes it possible to get out of and get into the vehicle from the entrance side of the parking space even if the parking space is very narrow.

Further, since the platform is in the front portion of the vehicle body, there is no need to ensure extra space on the left and/or right side of the vehicle for getting in and out of the vehicle. Combined with the pivot turning advantage at a small space, this helps to promote effective use of parking spaces.

DESCRIPTION OF EMBODIMENTS

Hereinafter, embodiments of the present invention will be described based on the attached drawings.

Embodiment 1

Figure 1:
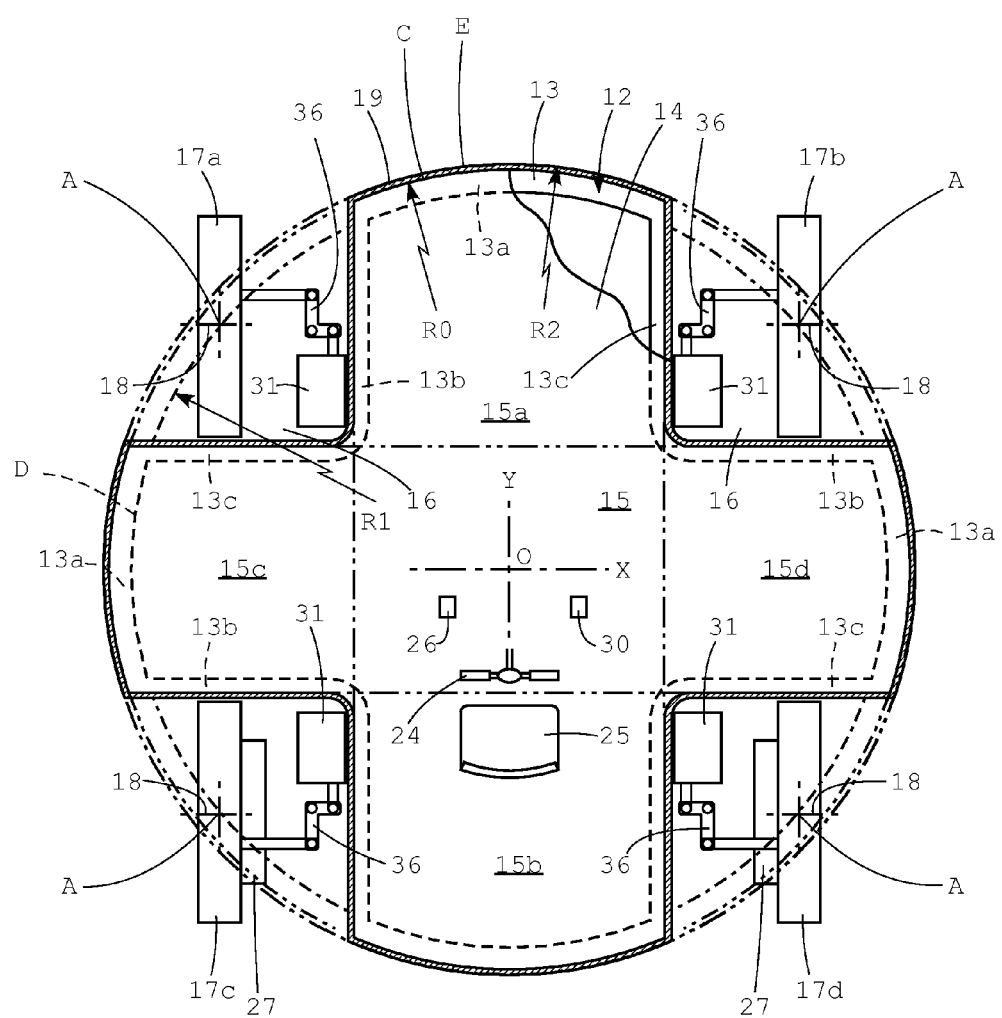
FIG. 1 is a cross-sectional plan view of an electric vehicle according to Embodiment 1.

As shown in FIG. 1, an electric vehicle according to Embodiment 1 has a configuration that in its plan view, an outer circumferential edge of a chassis 12 is on a chassis circle C of a radius R0. The chassis 12 is composed of a frame 13, a floor panel 14 on the frame 13, etc.

The frame 13 of the chassis 12 has a shape of a cross in a plan view, having a rectangular center portion 15 including its center O; a front end portion 15a and a rear end portion 15b in front of and at the rear of the center portion 15; and a left side portion 15c and a right side portion 15d on the left side and on the right side of the center portion 15. Each of the frame portions 15a through 15d is surrounded by three sides, i.e., an arc-shaped frame end edge 13a of a curvature radius which is identical with the radius R0 of the chassis circle C, and a left and a right-side frame side edges 13b, 13c.

In these frame portions 15a through 15d, each pair of mutually adjacent frame side edges 13b and 13c provides a squarely recessed space for a wheel housing 16, and at each of the four housings, a left or a right front wheel 17a or 17b or a left or a right rear wheel 17c, 17d is installed.

It should be noted here that each of the wheels 17a through 17d has a suspension, which is not illustrated since it is not directly related to the present invention.

The four wheels 17a through 17d are disposed in such a fashion that their kingpin axes cross the ground at intersections A on a wheel disposition circle D which has a smaller radius R1 than that of the outer circumferential circle C of the chassis 12, and that all the four wheels are in a symmetric pattern with each other with respect to two mutually vertical reference lines (X and Y) drawn in the left-right direction and the fore-aft direction to cross each other at the center O of the chassis 12.

Figure 2:
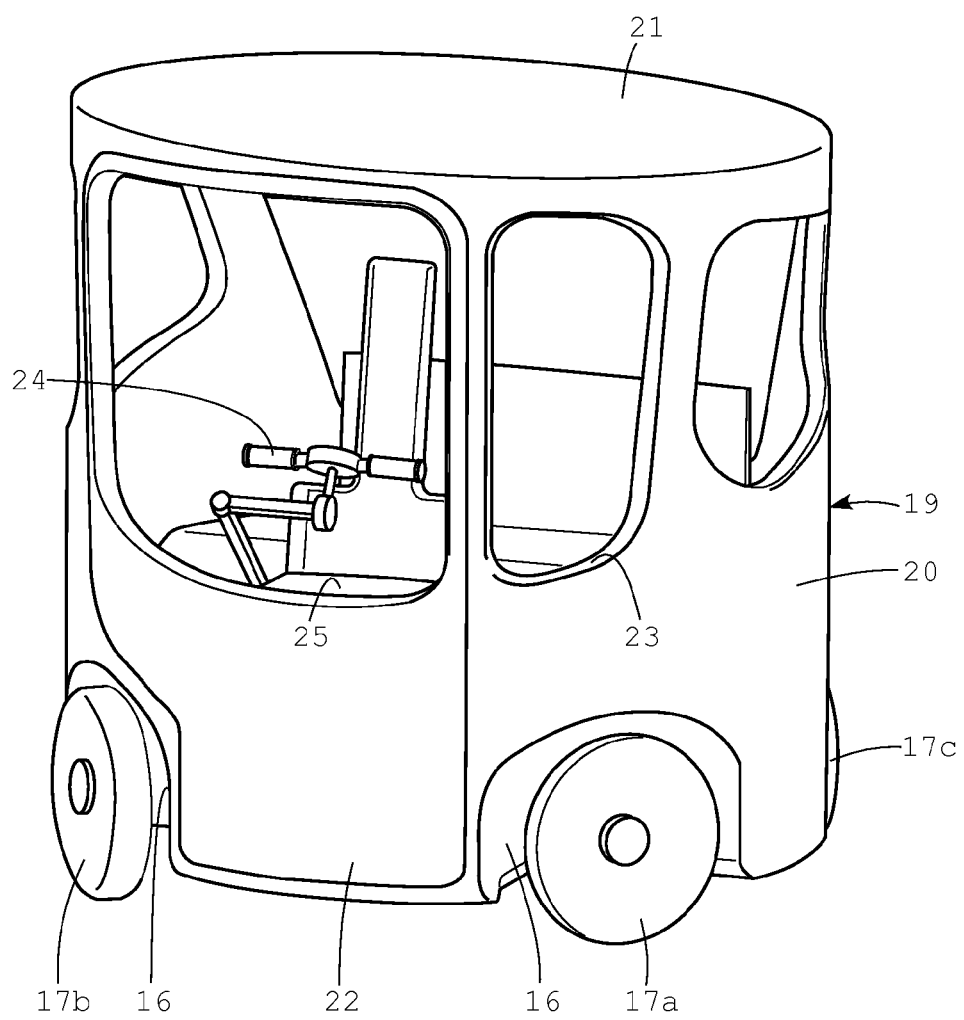
FIG. 2 is a perspective view of Embodiment 1.

The chassis 12 has a cabin 19 which is generally cylindrical as a whole as shown in FIG. 2, with a cylinder portion 20 having an outer circumferential surface following an outer circumferential surface of the chassis circle C. The radius R0 of the chassis circle C is extended to a radius R2 of a maximum circle E if a wall thickness of the cabin 19 is added. However, the wall thickness of the cabin 19 is negligibly small in comparison to the radius of the chassis circle C, so the maximum circle E is virtually equal to the chassis circle C.

Correspondingly to the wheel housings 16, the cabin 19 has four recesses from the outer circumferential surface of the cylinder portion 20 (see FIG. 2).

The cylinder portion 20 has its top opening closed with a circular top panel 21. Also, there is a platform 22 provided in a front surface of the cylinder portion 20, i.e., between the left and the right wheel housings 16. The platform 22 may have a hinged or a sliding door. In addition, the cylinder portion 20 has windows 23. Also, there is a driver's seat 25 with a handlebar 25 inside the cylinder portion 20, i.e., inside the vehicle. The driver's seat 25 is provided with an accelerator pedal 26 (see FIG. 1) for controlling in-wheel motor driving devices 27 and a brake pedal 30 for braking on the wheels 17a through 17d which will be described later.

It should be noted here that the figures show a rear wheel drive vehicle with the rear wheels 17c, 17d equipped with in-wheel motor driving devices 27. However, even if the vehicle is of a front wheel drive type or all wheel drive type, the wheel housing 16 has enough space for the in-wheel motor driving device 27, and therefore, it is possible to provide sufficient space between the left and the right wheel housings 16, and thus, there is no problem in disposing the platform 22 at front portion of the cabin 19.

Next, a controller for the wheels 17a through 17d will be described based on FIG. 3. The in-wheel motor driving device 27 includes, as already known, a motor section which generates a driving force; a speed reducer section which reduces rotating speed of the motor section and outputs the rotating force; and a wheel hub which transmits the output from the speed reducer section to a driving wheel. The speed reducer section is provided by a planetary gear system for example. The in-wheel motor driving devices 27 are controlled by a motor control unit 28 which is installed in the chassis 12, whereby rotation speed, rotation direction, etc. of the rear wheels 17c, 17d are controlled.

Also, an independent-steering apparatus 29 is installed in the chassis 12 for steering control of the wheels 17a through 17d. The independent-steering apparatus 29 is implemented by a steering-by-wire system which will be described next.

Specifically, each of the wheels 17a through 17d is equipped with a steering actuator 31. As shown in FIG. 3, the steering actuator 31 includes a motor 32 and a linear motion mechanism 33 driven thereby. The linear motion mechanism 33 has a nut 34 on a driving shaft of the motor 32, and a threaded rod 35 threaded through the nut 34. Typically, the nut 34 and the threaded rod 35 are provided by a ball screw. As the motor 32 is driven, the nut 34 rotates at a fixed position, moving the threaded rod 35 in its axial direction.

The threaded rod 35 is connected to an end of an L-shaped knuckle arm 36. The knuckle arm 36 is swingly connected by a corner pin 37 within a plane, and is connected to an end of a knuckle 38 which has another end connected to the wheel hub. As the motor 32 rotates, the first end of the knuckle arm 36 is moved in a fore-aft direction whereas the knuckle 38 at the second end rotates in a circumferential direction, to set the corresponding one of the wheels 17a through 17d to a predetermined steering angle θ (see FIG. 4).

The steering actuator 31 is controlled by a steering angle control unit 39 installed in the chassis 12. The chassis 12 is also provided with a handlebar operation-amount sensor 40 which detects an amount by which the handlebar 24 was moved, and a detection signal is inputted to the steering angle control unit 39. Based on the detection signal which represents the amount of handlebar operation, the steering angle control unit 39 calculates a target steering angle θ and controls the steering actuators 31.

In addition to the above, the driver's seat 25 has a small-radius turn switch 41 for making a three-point turn when driving into a very narrow road or making a U turn; and a pivot turn switch 42 for making a pivot turn within a very narrow space. When the small-radius turn switch 41 gets turned ON, a small-radius turn signal is inputted to the steering angle control unit 39. Likewise, when the pivot turn switch 42 gets turned ON, a pivot turn signal is inputted to the motor control unit 28 and the steering angle control unit 39. The pivot turn switch 42 has a switching position for a left-turn and a switching position for a right-turn. It should be noted here that in place of an ON/OFF switching operation, the small-radius turn may be initiated by automatic recognition method based on the angle of steering made to the steering section and the vehicle driving speed.

The automobile according to Embodiment 1 has been described thus far. Next, description will cover functions of the automobile.

[Straight Drive]

Figure 3:
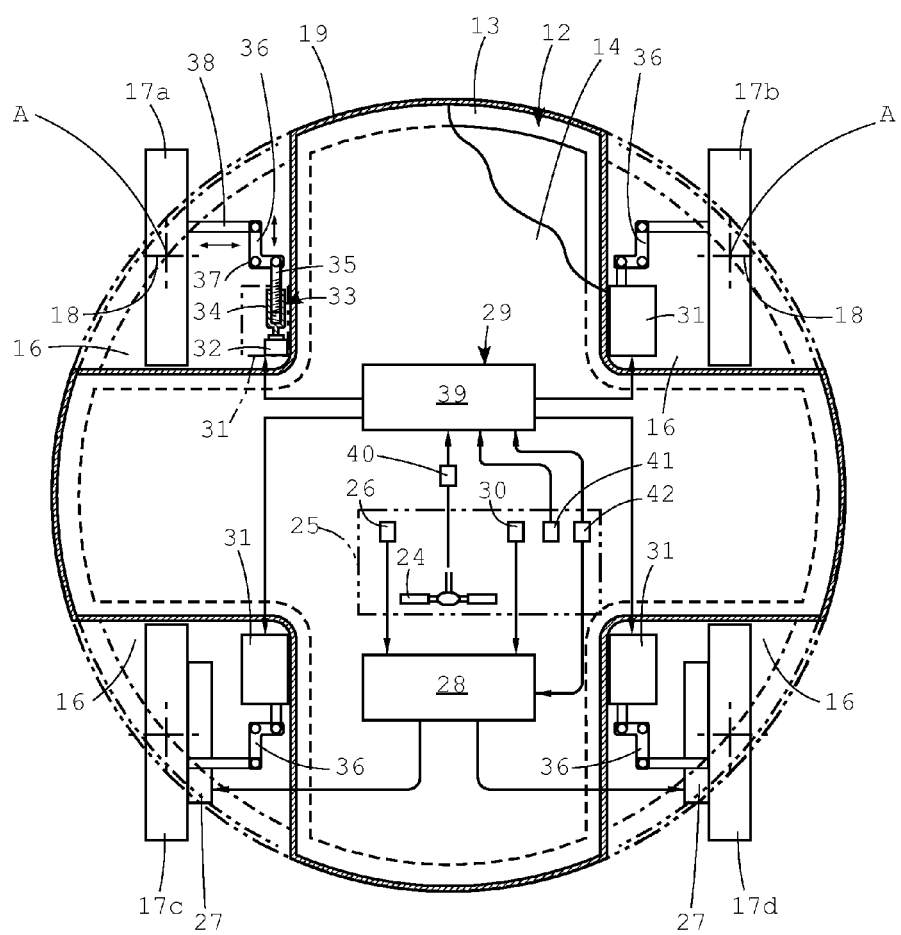
FIG. 3 is a cross-sectional plan view of Embodiment 1, showing together with a control block diagram.

FIG. 3 shows a state when the vehicle is driving straightly. Before the vehicle is moved, a signal from the handlebar operation-amount sensor 40 is picked and based on the signal, the steering angle control unit 39 calculates a steering angle (=0°). Then, the steering actuators 31 are controlled to set the wheels 17*a* through 17*d* to the obtained steering angle. As the accelerator pedal 26 at the driver's seat 25 is operated, the motor control unit 28 responds to drive the in-wheel motor driving devices 27, whereby the rear wheels 17*c*, 17*d* are driven to move the vehicle straightly. Forward drive and rearward drive can be switched by using an unillustrated lever for example.

[Small-Radius Turning]

Figure 4:
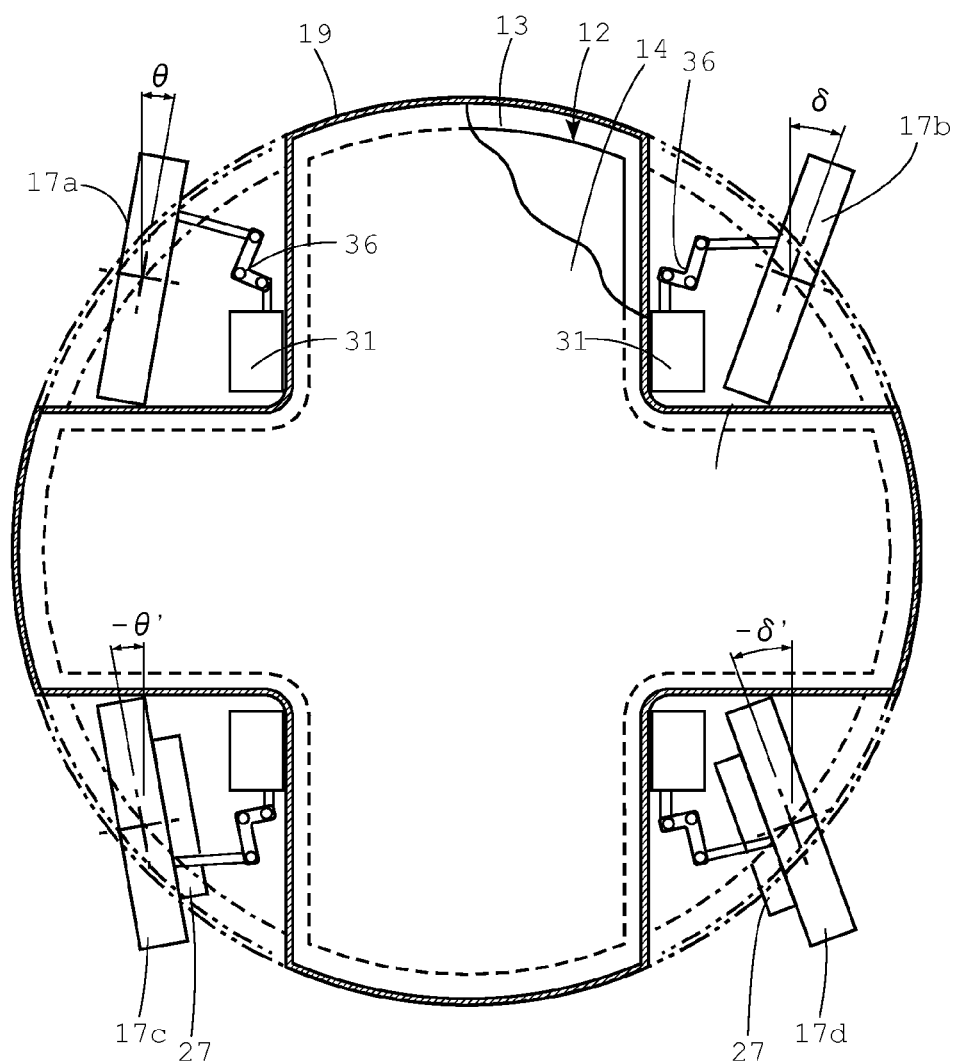
FIG. 4 is a cross-sectional plan view of Embodiment 1 during a small-radius turn.

As shown in FIG. 4, when changing the driving directions such as when changing lanes, making a U turn, etc., steering operation is typically performed only to the front wheels 17*a*, 17*b*. When it is necessary to make a three-point turn to drive the vehicle into a narrow path or to make a U turn, the small-radius turn switch 41 at the driver's seat 25 is operated. Then, the small-radius turn signal is inputted to the steering angle control unit 39, and the unit 39 controls steering actuators 31 of the rear wheels 17*c*, 17*d*, thereby setting the rear wheels 17*c*, 17*d* to steering angles −θ', −δ' respectively which are given by flipping steering angles θ, δ of the corresponding front wheels 17*a*, 17*b*.

The above-described control eliminates what is generally known as the difference between a track followed by the front inner wheel and a track followed by the back inner wheel, and therefore enables a change of the driving direction in a small radius. For the sake of maintaining stability of the chassis 12, however, the steering must be performed at a slower speed than a predetermined limit. Small-radius turning while backing up is achieved by the same control.

[Pivot Turning]

Figure 5:
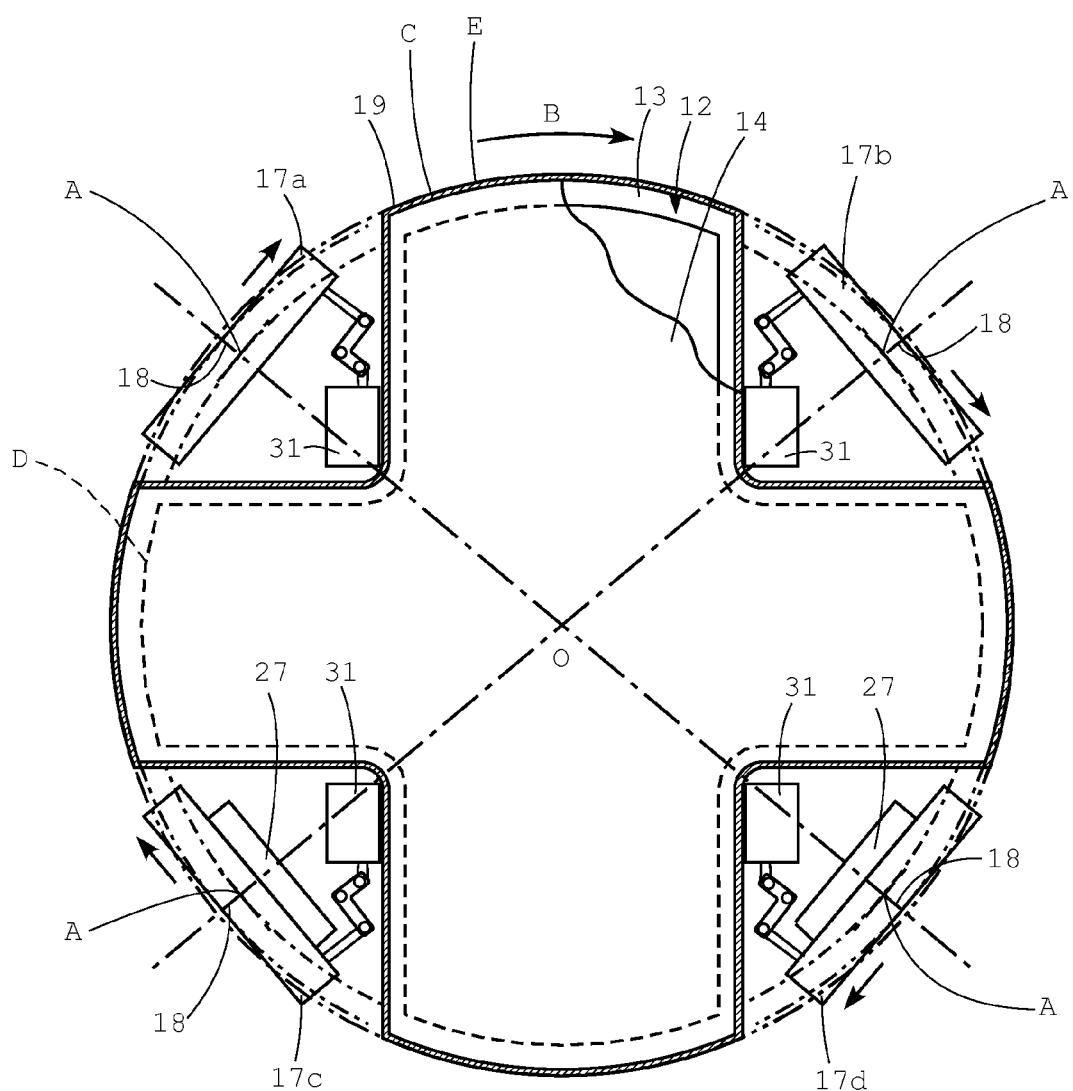
FIG. 5 is a cross-sectional plan view during a pivot turn.

When pivot turning is necessary at a narrow parking space for example, the pivot turn switch 42 at the driver's seat 25 is operated. As the pivot turn signal is inputted to the steering angle control unit 39, the unit 39 controls the steering actuators 31 for setting the wheels 17*a* through 17*d* to such angles that all of the wheels 17*a* through 17*d* have their wheel axes 18 in a radial direction of the wheel disposition circle D as shown in FIG. 5. Due to this control, the front wheels 17*a*, 17*b* are set in a forwardly narrowing pattern while the rear wheels 17*c*, 17*d* are set in a rearwardly narrowing pattern.

Simultaneously, a pivot turn signal (e.g., for a right turn (see Arrow B in FIG. 5)) is inputted to the motor control unit 28. Then, as shown in FIG. 5, the left rear wheel 17*c* rotates in the forward driving direction while the right rear wheel 17*d* rotates in the rearward driving direction. In other words, these wheels are set to rotate in opposite directions. The left and the right front wheels 17*a*, 17*b* follow their respective rear wheels 17*c*, 17*d*, i.e., the left front wheel 17*a* is rotated in the forward driving direction while the right front wheel 17*b* is rotated in the rearward driving direction.

For a four-wheel drive vehicle, the left wheel and the right wheel are set to rotate in mutually opposite directions in both of the front pair and the rear pair of wheels (namely, the left front wheel 17*a* is set for forward driving; the right front wheel 17*b* is set for rearward driving; the left rear wheel 17*c* is set for forward driving; and the right rear wheel 17*d* is set for rearward driving). At the same time, both of the wheels on the left side are set to rotate in the same direction, with both of the wheels on the right side to rotate in the same direction; namely, the left front wheel 17*a* and the left rear wheel 17*c* are both set for the forward driving whereas the right front wheel 17*b* and the right rear wheel 17*d* are both set for the rearward driving. As a result, the chassis 12 and a body 19 turn on the center O, within the maximum circle E, or virtually within the chassis circle C.

In the above-described pivot turning, the minimum space necessary for the turning is practically the space of the chassis circle C. Since the wheel disposition circle D and the body 19 are within the chassis circle C, there is nothing protruding out of the space. Therefore, there is no interference with the surrounding objects.

It should be noted here that as shown in FIG. 5, part of the wheels 17*a* through 17*d* come out of the chassis circle C during the pivot turning, but such is well absorbed in a normal margin of the parking space and therefore will not pose any substantive problems.

Because of these properties, this vehicle provides such an advantage that when driving out of a narrow parking space where the vehicle was driven into by forward driving, the driver can simply make a pivot turn and then get out of the space by forward driving, although drivers in conventional automobiles have to get out of the space by backing up his/her vehicle.

Also, since in-wheel motor driving devices 27 are used, it is possible to provide a sufficient space in the front part of the chassis 12 even if the vehicle is of a front wheel drive type. For this reason, it is possible to provide the platform 22 in a front part of the body 19. This provides a wide view at the time of getting out of the vehicle for increased safety in getting in and out of the vehicle. Also, no extra space is required on the left nor right side of the parking space for getting in and out of the vehicle. Further, even if the vehicle was driven forwardly into a narrow parking space with a dead end, it is possible to get out of the vehicle from the open-end side of the parking space by making a pivot turn.

Figure 6:
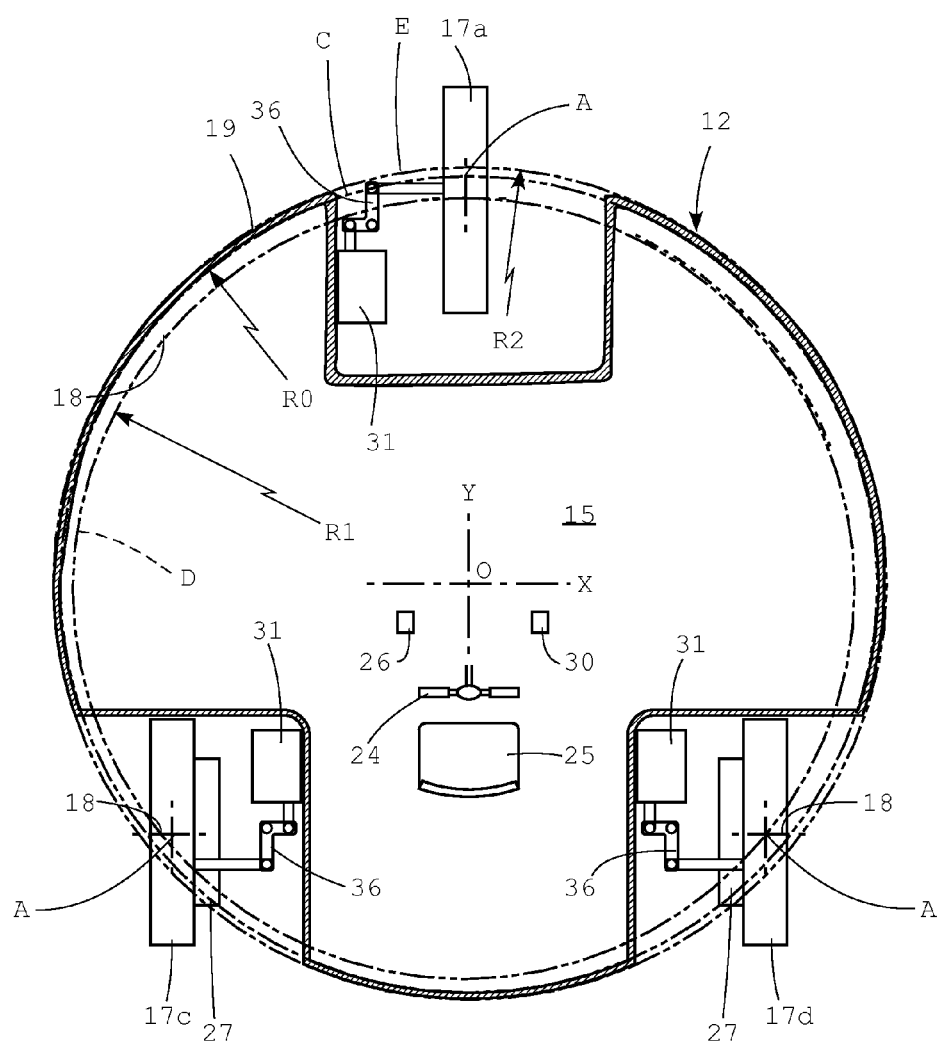
FIG. 6 is a cross-sectional view of an embodiment as an application to a three-wheel vehicle.

Thus far, description has been made for a four-wheel automobile. However, the present invention is also applicable to three-wheel automobiles as shown in FIG. 6. FIG. 6 shows an embodiment in which the left and the right rear wheels 17*c*, 17*d* are equipped with in-wheel motor driving devices 27, but the in-wheel motor driving device 27 may be provided only in the front wheel 17*a* or may be provided in each of the three wheels.

REFERENCE SIGNS LIST

A Intersection between kingpin axis and ground
12 Chassis
13 Frame
13*a* Frame end edge
13*b*, 13*c* Frame side edge
14 Floor panel
15 Center portion
15*a* Front end portion
15*b* Rear end portion
15*c* Left side portion
15*d* Right side portion
16 Wheel housing
17*a*-17*d* Wheels
18 Wheel axis
19 Cabin
20 Cylinder portion
21 Top panel 22 Platform
23 Window
24 Handlebar
25 Driver's seat
26 Accelerator pedal
27 In-wheel motor driving device
28 Motor control unit
29 Independent-steering apparatus
30 Brake pedal
31 Steering actuator
32 Motor
33 Linear motion mechanism
34 Nut
35 Screw rod
36 Knuckle arm
37 Corner pin
38 Knuckle
39 Steering angle control unit
40 Handlebar operation-amount sensor
41 Small-radius turn switch
42 Pivot turn switch

The invention claimed is:

1. An electric vehicle comprising:
    four wheels including a left front wheel, a right front wheel, a left rear wheel, and a right rear wheel, wherein a kingpin axis in each wheel intersects with a road surface on a circle inboard of a vehicle body;
    an in-wheel motor driving device incorporated only in each of the left and the right front wheels, only in each of the left and the right rear wheels, or in all of the wheels; and
    an independent-steering apparatus for steering all of the wheels,
    wherein the independent-steering apparatus is a steering-by-wire system including: a handlebar operation-amount sensor; a steering angle control unit for arithmetic control of a steering angle of each wheel based on a handlebar operation-amount signal detected by the handlebar operation-amount sensor; steering actuators controlled by the steering angle control unit; and knuckle arms each connected to one of the steering actuators; wherein each knuckle arm is connected to a knuckle on the wheel side.

2. The electric vehicle according to claim 1, wherein all of the wheels is are steerable to a degree that is not smaller than 90 degrees with respect to a reference line in a fore-aft direction.

3. The electric vehicle according to claim 1, comprising a chassis including a cabin having a generally cylindrical external shape.

4. The electric vehicle according to claim 3, wherein the cabin of the chassis has a front part provided with a platform.

5. The electric vehicle according to claim 1, wherein the steering actuator includes a motor and a linear motion mechanism driven by the motor, the linear motion mechanism moving an end portion of an L-shaped knuckle arm in a fore-aft direction of the vehicle while moving another end portion of the knuckle arm in a widthwise direction of the vehicle.

6. The electric vehicle according to claim 5, wherein the linear motion mechanism includes a nut which is rotated by the motor at a fixed position, and a threaded rod threaded through the nut and connected to the knuckle arm.

7. The electric vehicle according to claim 1, further comprising a small-radius turn switch provided at a driver's seat in the vehicle body for input of a small-radius turn signal to the steering angle control unit, for the steering angle control unit to control each steering actuator based on the small-radius turn signal thereby setting the left and the right rear wheels to steering angles given by flipping respective steering angles of the corresponding left and the right front wheels.

8. The electric vehicle according to claim 1, further comprising a pivot turn switch provided at the driver's seat in the vehicle body for input of a pivot turn signal to the steering angle control unit and the motor control unit, for the steering angle control unit to control each steering actuator based on the pivot turn signal thereby setting each wheel to such an angle which brings the wheel in the radial direction of a circle defined inboard of the vehicle body; and for the motor control unit to control each in-wheel motor driving device based on the pivot turn signal thereby setting, if the vehicle is a two-wheel drive vehicle, the drive wheels to rotate in opposite directions from each other, and if the vehicle is a four-wheel drive vehicle, the left wheels and the right wheels to rotate in opposite directions from each other in both of the front and the rear pairs of wheels, and both of the left wheels to rotate in an identical direction with each other, with both of the right wheels to rotate in an identical direction with each other.

9. An electric vehicle comprising:
    three wheels including a front wheel, a left rear wheel, and a right rear wheel, or a left front wheel, a right front wheel, and a rear wheel, wherein a kingpin axis in each wheel intersects with a road surface on a circle inboard of a vehicle body;
    an in-wheel motor driving device incorporated only in the front wheels, only in the rear wheels, or in all of the wheels; and
    an independent-steering apparatus for all of the wheels,
    wherein the independent-steering apparatus is a steering-by-wire system including: a handlebar operation-amount sensor; a steering angle control unit for arithmetic control of a steering angle of each wheel based on a handlebar operation-amount signal detected by the handlebar operation-amount sensor; steering actuators controlled by the steering angle control unit; and knuckle arms each connected to one of the steering actuators; wherein each knuckle arm is connected to a knuckle on the wheel side.

10. The electric vehicle according to claim 9, wherein all of the wheels are steerable to a degree that is not smaller than 90 degrees with respect to a reference line in a fore-aft direction.

11. The electric vehicle according to claim 9, comprising a chassis including a cabin having a generally cylindrical external shape.

12. The electric vehicle according to claim 11, wherein the cabin of the chassis has a front part provided with a platform.

13. The electric vehicle according to claim 9, wherein the steering actuator includes a motor and a linear motion mechanism driven by the motor, the linear motion mechanism moving an end portion of an L-shaped knuckle arm in a fore-aft direction of the vehicle while moving another end portion of the knuckle arm in a widthwise direction of the vehicle.

14. The electric vehicle according to claim 13, wherein the linear motion mechanism includes a nut which is rotated by the motor at a fixed position, and a threaded rod threaded through the nut and connected to the knuckle arm.

15. The electric vehicle according to claim 9, further comprising a small-radius turn switch provided at a driver's seat in the vehicle body for input of a small-radius turn signal to the steering angle control unit, for the steering angle control unit to control each steering actuator based on the small-radius turn signal thereby setting the left and the right rear wheels to steering angles given by flipping respective steering angles of the corresponding left and the right front wheels.

16. The electric vehicle according to claim 9, further comprising a pivot turn switch provided at the driver's seat in the vehicle body for input of a pivot turn signal to the steering angle control unit and the motor control unit, for the steering angle control unit to control each steering actuator based on the pivot turn signal thereby setting each wheel to such an angle which brings the wheel in the radial direction of a circle defined inboard of the vehicle body; and for the motor control unit to control each in-wheel motor driving device based on the pivot turn signal thereby setting, if the vehicle is a two-wheel drive vehicle, the drive wheels to rotate in opposite directions from each other, and if the vehicle is a four-wheel drive vehicle, the left wheels and the right wheels to rotate in opposite directions from each other in both of the front and the rear pairs of wheels, and both of the left wheels to rotate in an identical direction with each other, with both of the right wheels to rotate in an identical direction with each other.

\* \* \* \* \*